United States Patent [19]

Lowers

[11] Patent Number: 4,997,111

[45] Date of Patent: Mar. 5, 1991

[54] LIQUID DISPENSING APPARATUS

[76] Inventor: Richard Lowers, Medical Center Road 75, Chicora, Pa. 16025

[21] Appl. No.: 448,832

[22] Filed: Dec. 12, 1989

[51] Int. Cl.[5] .................... G01F 11/00

[52] U.S. Cl. .................... 222/278; 222/288; 222/399; 222/400.7; 222/400.8

[58] Field of Search .................... 222/278, 279, 288, 400.7, 222/400.8, 399

[56] References Cited

U.S. PATENT DOCUMENTS

| | | | |
|---|---|---|---|
| 615,166 | 11/1898 | Haefner | 222/400.8 X |
| 1,915,728 | 6/1933 | Gabler | 222/400.8 X |
| 2,052,563 | 9/1936 | Gould | 222/400.8 X |
| 2,061,240 | 11/1936 | Leins | 222/400.8 X |
| 2,638,758 | 5/1953 | Daun | 222/400.8 X |
| 3,642,174 | 2/1972 | Cornelius | 222/278 X |
| 4,124,147 | 11/1978 | Priese et al. | 222/288 X |

*Primary Examiner*—Andres Kashnikow
*Assistant Examiner*—Gregory L. Huson
*Attorney, Agent, or Firm*—George C. Atwell

[57] ABSTRACT

A unified structure defining a liquid dispensing apparatus mounted on a stand pipe that protrudes outwardly through an outlet passage in a tubular fitting and is adapted to be sealably mounted in one end of a liquid container. The structure also includes a dispensing valve fixed on the outer end of the stand pipe and projecting laterally therefrom, and a pair of spaced clamp members that extend in a laterally direction opposite to the dispensing valve and having a configuration which provides clamping supports for a high pressure gas canister and a manually operable hand pump in a linear arrangement relative to the direction of projection of the dispensing valve. The tubular fitting in the container includes an inlet passage which is connected to a pressure regulator valve mounted on the gas canister by a pressure supply line. The hand pump is operatively connected to the pressure supply line and, with shut-off valves being associated with both the hand pump and gas canister, either one or the other may be selectively operated to maintain the liquid within the container under pressure.

6 Claims, 2 Drawing Sheets

LIQUID DISPENSING APPARATUS

BACKGROUND OF THE INVENTION

The present invention pertains to apparatus for dispensing liquid from a container and, more particularly, to a unified structure made up of several distinct components mounted on a stand pipe that extends outwardly from one end of the container. The unified structure of the invention includes a liquid dispensing valve as well as a high pressure gas canister and a hand pump for maintaining the liquid in the container under pressure.

It is a common practice for a beverage such as beer or ale to be sold in a bulk container in the form of a barrel or keg and then later dispensed from the container by the purchaser utilizing a portable pressurizing device for pumping gas into the container whereby the gas will force the liquid beverage out through an outlet conduit when a dispensing valve is manually opened. The pressurizing gas may be ambient air compressed and forced into the container by a typical hand air pump or it may be carbon dioxide released from an adjunct pressurized container and injected through appropriate connection means into the beverage container.

Of the two gases generally used for the aforedescribed purpose, carbon dioxide is much preferred, particularly in the pressurized dispensing of beer or ale, because it tends to maintain the quality and flavor characteristics of the beverage whereas air, particularly after a prolonged time period, will result in flavor deterioration. Nevertheless, the use of pressurized air to dispense beer from a keg continues to have its place because it is relatively less expensive and may be quite adequate for the intended purpose, if all of the liquid is to be dispensed from the container in a relatively short period of time or where all immediately available carbon dioxide has been exhausted and pumping air into the pressurized container to achieve dispensation of the liquid is the only available alternative.

BRIEF DESCRIPTION OF THE PRIOR ART

It is common practice to provide liquid containers with dispensing valves and to maintain the liquid within the container under pressure by such means as a $CO_2$ canister or a manually operable hand pump.

The teachings of U.S. Pat. No. 706,792, issued to Edward A. August, is believed to be representative of the prior art. However, the apparatus of this reference differs from the present invention in that the structure shown and described could not be combined as a unit and mounted on the container's stand pipe as shown and described by the present invention.

A number of other United States patents show and describe container-mounted pressurization systems that utilize hand pumps and, for reference to the teachings of such disclosures, attention is hereby drawn to U.S Pat. Nos. 3,494,514 and 4,350,273.

SUMMARY OF THE INVENTION

Ideally, a device or apparatus capable of selectively providing either hand-pumped air or carbon dioxide into a pressurized liquid container is both useful and desirable, and it is toward this concept that this invention is addressed. The purchaser of beer in a bulk keg container quite often intends it to be consumed by a group at a picnic, party, or outing. The location for its consumption may be a remote picnic area or on board a pleasure boat where carbon dioxide cannot be quickly replenished and alternate means of pressurizing the beverage container would be particularly desirable.

The liquid dispensing apparatus according to the invention includes a stand pipe protruding through a tubular fitting sealably mounted in one end of a liquid container. The stand pipe has a dispensing valve fixed on its outer end and, adjacent thereto, a pair of spaced and laterally-extending support clamps. These support clamps have a configuration which enables them to support a high pressure gas canister, such as a $CO_2$ canister, and, immediately adjacent thereto, a manually operable hand pump. The $CO_2$ canister, through a regulator valve and a shut-off valve, is connected to an inlet passage provided in the tubular fitting by means of a pressure supply line. The hand pump also includes a shut-off valve and a pressure supply line that is operatively connected to the pressure supply line extending from the $CO_2$ canister. Either the $CO_2$ canister or the hand pump can be selectively utilized to maintain the liquid within the container under a desired amount of pressure.

It is a general object of the invention to provide a dispensing apparatus for a liquid container having alternate means of gas induction to the container in a unified structure that can be mounted on an elongated stand pipe that protrudes from the container.

A further object of the invention is to provide a unified dispensing apparatus having a high pressure gas source and an auxiliary pressure source.

A further and more specific object of the invention is to provide a unified dispensing apparatus that is of simplified construction which is relatively inexpensive to manufacture and with long life expectancy.

A further object of the invention is to provide a unified beverage dispensing apparatus for a pressurized container, including a pair of separately operable gas induction devices, each capable of pressurizing the container, and both supportably dependent upon a single elongated stand pipe or dispensing conduit whereby uncoupling of the stand pipe from the container effects total removal of the apparatus as a unit.

It is a further object of the invention to provide a unified beverage dispensing apparatus, including a cylindrical carbon dioxide storage tank and an elongated cylindrical hand pump, both of which are mounted in a cantilevered arrangement on a liquid dispensing stand pipe, wherein the axes of the tank, the pump, and the stand pipe are parallel and in linear alignment, with the hand pump most closely adjacent the stand pipe.

These and other objects of the invention will become more fully apparent by reference to the appended claims and as the following detailed description proceeds in reference to the figures of drawing wherein:

DETAILED DESCRIPTION OF THE PREFERRED EMBODIMENT

Figure 1:
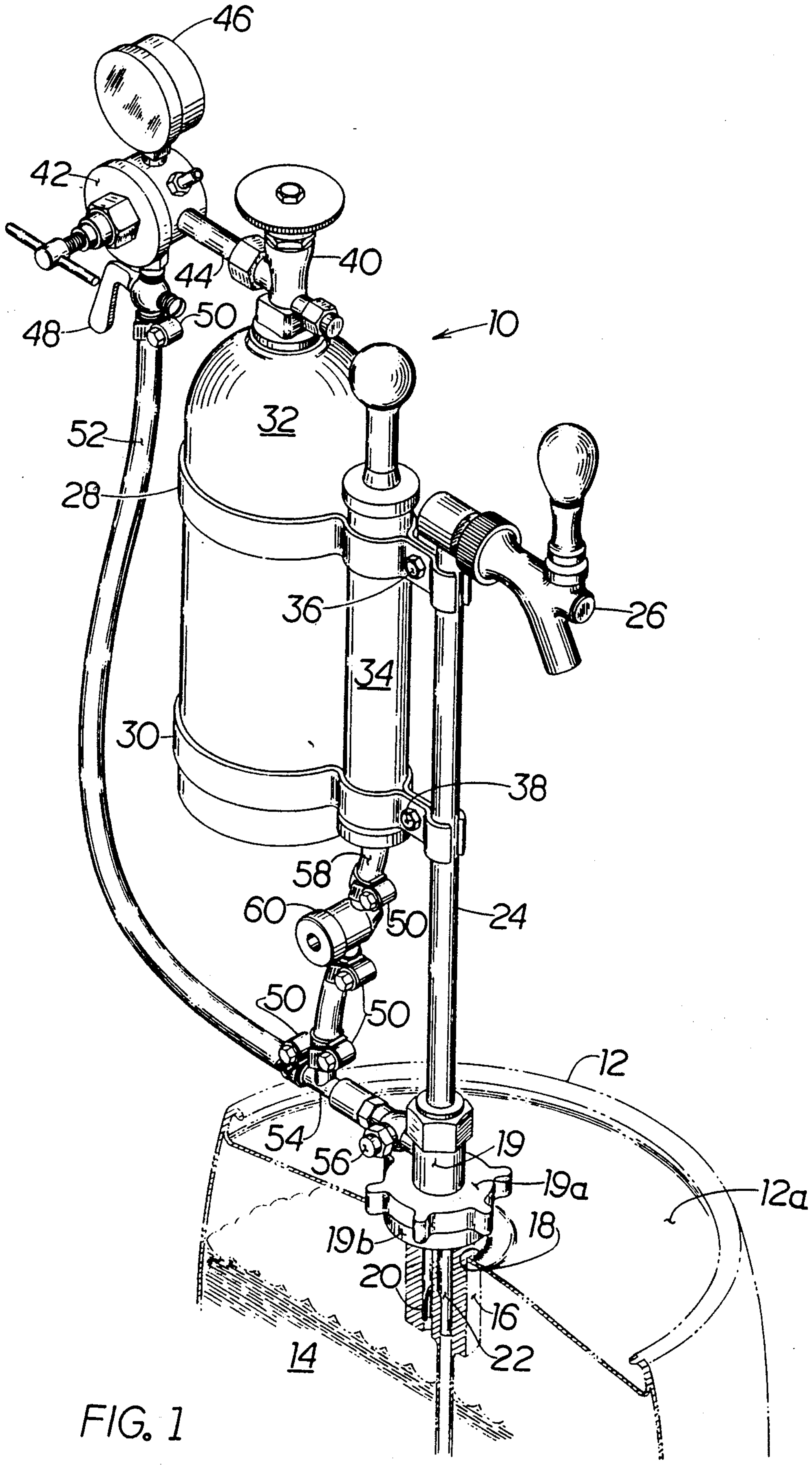
FIG. 1 is a perspective view of the unified dispensing apparatus according to the invention shown mounted on the stand pipe protruding from a liquid container.
Figure 2:
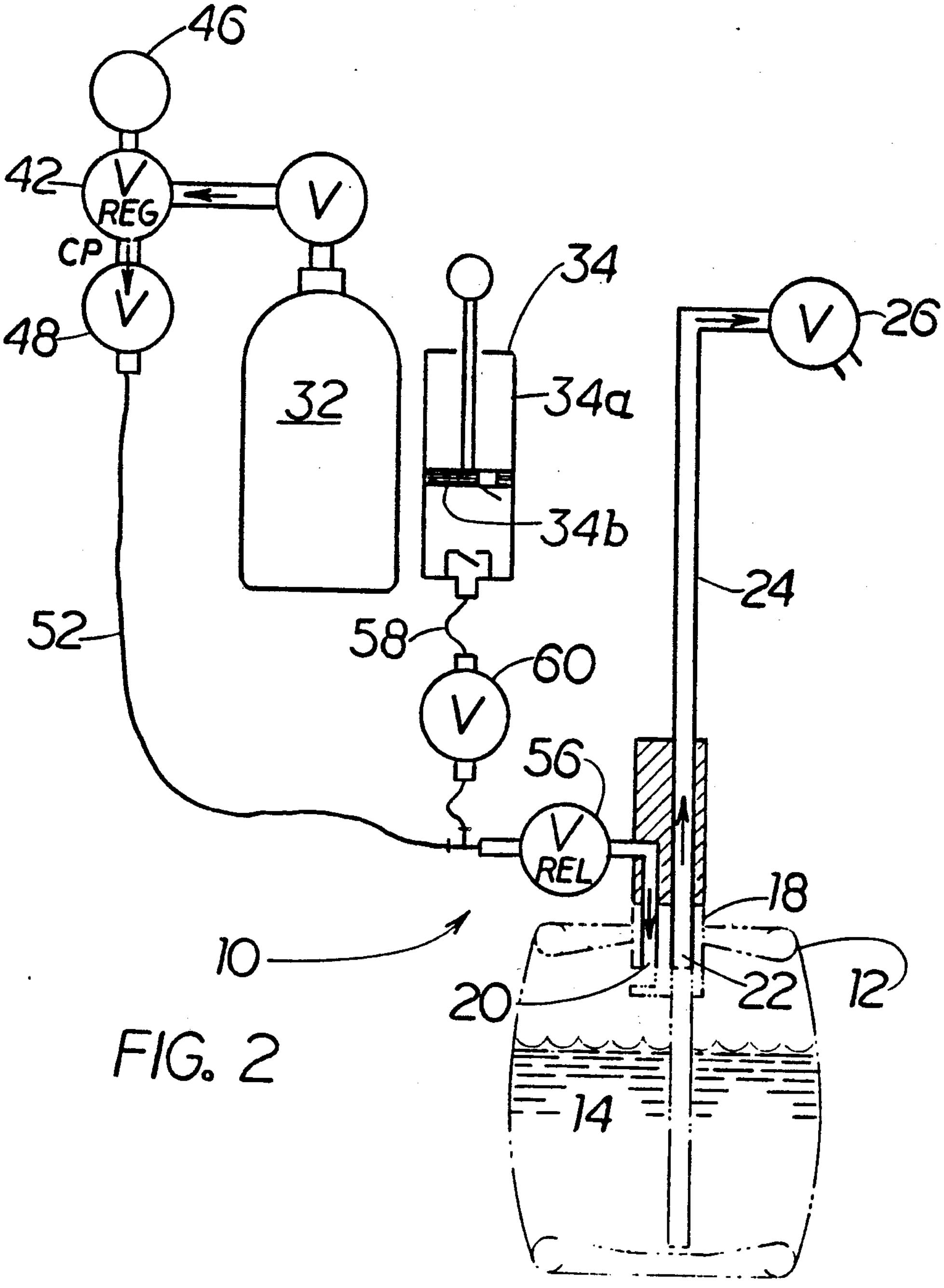
FIG. 2 is a schematic view of the elements in FIG. 1 and with further detail of the inlet and outlet passages in the tubular fitting and the gas and liquid flow patterns provided by the apparatus of FIG. 1.

Referring now to the figures of the accompanying drawings, the liquid dispensing apparatus according to the invention is identified generally in FIG. 1 by numeral 10 and includes among its various parts a container 12 containing a liquid 14. A tubular fitting 16 is sealably mounted in an opening 18 provided in one end of the container 12. The tubular fitting 16 projects through a cylindrical housing 19 which is mounted in position by means of a rotatable nut 19*a* which threadably engages to an annular collar 19*b* permanently affixed to the flat end 12*a* of the container, in the opening 18. The housing 19 defines an inlet passage 20 and an outlet passage 22 (see FIG. 2). A stand pipe 24 extends from within the container outwardly through the outlet passage 22 of the tubular fitting 16 and has a dispensing valve 26 fixed on the outer end thereof and projecting transverse to the axis of the stand pipe 24.

Dual cantilever-type support means project laterally from the stand pipe 24, preferably in the form of rigid clamps 28 and 30, which are fabricated from elongated strap members. These clamps 28 and 30 have a configuration as shown in FIG. 1 which enables them to support by clamping pressure a high pressure gas tank or canister 32 and a hand pump 34. The clamps are designed to be clamped on the stand pipe by means of bolts 36 and 38, respectively. The high pressure gas canister 32 includes a conventional pressure release valve 40 that is connected to a regulator valve 42 by means of a pipe 44. A pressure gauge 46 is mounted on the top of the regulator valve 42 and a flow control valve 48 is assembled on the underside of said regulator valve 42. By means of a hose clamp 50, one end of a pressure supply line 52 is connected to the flow control valve 48 and the opposite end thereof is connected to a T-fitting 54 that is operatively connected to the inlet passage 20 of the tubular fitting 16 by means of a valve 56.

The hand pump 34, supported intermediate the high pressure gas canister 32 and the stand pipe 24, includes a pressure supply line 58 depending from the underside thereof. This pressure supply line 58 is connected to the T-fitting 54 and includes a flow control valve 60 intermediate to its end.

Either the high pressure gas canister 32 or the hand pump 34 can be operated to maintain the liquid 14 within the container 12 under a desired amount of pressure. The hand pump 34 serves as an auxiliary air pressure source and provides a means whereby the liquid 14 within the container 12 can be maintained under pressure in the event of loss of pressure from the high pressure gas canister 32.

The major components of the apparatus of the present invention are the stand pipe 24, the pump 34, and the canister 32, which are rigidly joined into a unified structure by the rigid clamps 28 and 30. All three of these components are cylindrical in cross-section, with the stand pipe having a comparatively slim diameter as compared to either the canister 32 or the pump 34. The pump 34 comprises an elongated tubular body 34*a* housing a reciprocal piston 34*b*. The pump 34 is intentionally mounted in close adjacency to the stand pipe 24, with the axis of the pump body 34*a* parallel to the axis of the stand pipe. By this arrangement, manual force exerted on the pump 34 to reciprocate the piston 34*b* is borne by the stand pipe and is translated thereto by the most rigid part of the clamps 28 and 30. The axes of the canister 32, the pump 34, and the stand pipe 24 are parallel and in the same common plane as the projection of the dispensing valve 26 to provide a balanced unified structure which, when removed from the container 12 is easily manually handled to charge or refill the canister 32.

Although the present invention has been described in connection with a preferred embodiment, it is to be understood that modifications and variations may be resorted to without departing from the spirit and scope of the invention as those skilled in the art will readily understand. Such modifications and variations are considered to be within the purview and scope of the invention and the appended claims.

I claim:

1. A liquid dispensing apparatus for use in combination with a pressurized liquid container comprising, as a unified structure:
   - a tubular fitting having inlet and outlet passages adapted to be sealably mounted in one end of said container;
   - an elongated stand pipe extending outwardly through the outlet passage of said tubular fitting, having a dispensing valve fixed on the outer end thereof;
   - rigid support means mounted on the stand pipe to project laterally therefrom and defining a dual cantilever arrangement projecting from the stand pipe having elongated strap elements forming clamp members;
   - a high pressure gas canister mounted in said support means and having a regulator valve with pressure gauge to control the flow of gas therefrom and a pressure supply line operatively connecting the regulator valve to the inlet passage of said tubular fitting; and
   - a hand-operable air pump mounted in said support means immediately adjacent to said stand pipe and operatively connected to the pressure supply line from said high pressure gas canister.

2. The apparatus according to claim 1 wherein the pressure supply line from said high pressure gas canister includes a manually operable shut-off valve permitting the build-up of pressure within said container by said hand-operable pump.

3. The apparatus according to claim 1 wherein the connection of said hand-operable pump to the pressure supply line includes a manually operable shut-off valve for effecting uninterrupted flow of gas pressure from said high pressure canister into said container.

4. The apparatus according to claim 1 wherein said elongated strap elements forming clamps have a shape conforming to the combined configuration of said high pressure canister, hand operable pump, and stand pipe.

5. The apparatus according to claim 1 wherein the dispensing valve projects on a line transverse to the axis of the stand pipe, the pump has an elongated cylindrical body and is disposed immediately adjacent the stand pipe and generally opposite to the direction of projection of the dispensing valve, the axis of the cylindrical body is parallel to the stand pipe axis, the canister is cylindrical and its axis is parallel to the axes of the pump body and the stand pipe, and the axes of the stand pipe, pump body, and canister are in a common plane.

6. The apparatus according to claim 5 wherein the dispenser valve projects in the common plane.

* * * * *